Oct. 22, 1935.  F. H. WATSON  2,018,584
VALVE STEM
Filed March 29, 1932   2 Sheets-Sheet 1
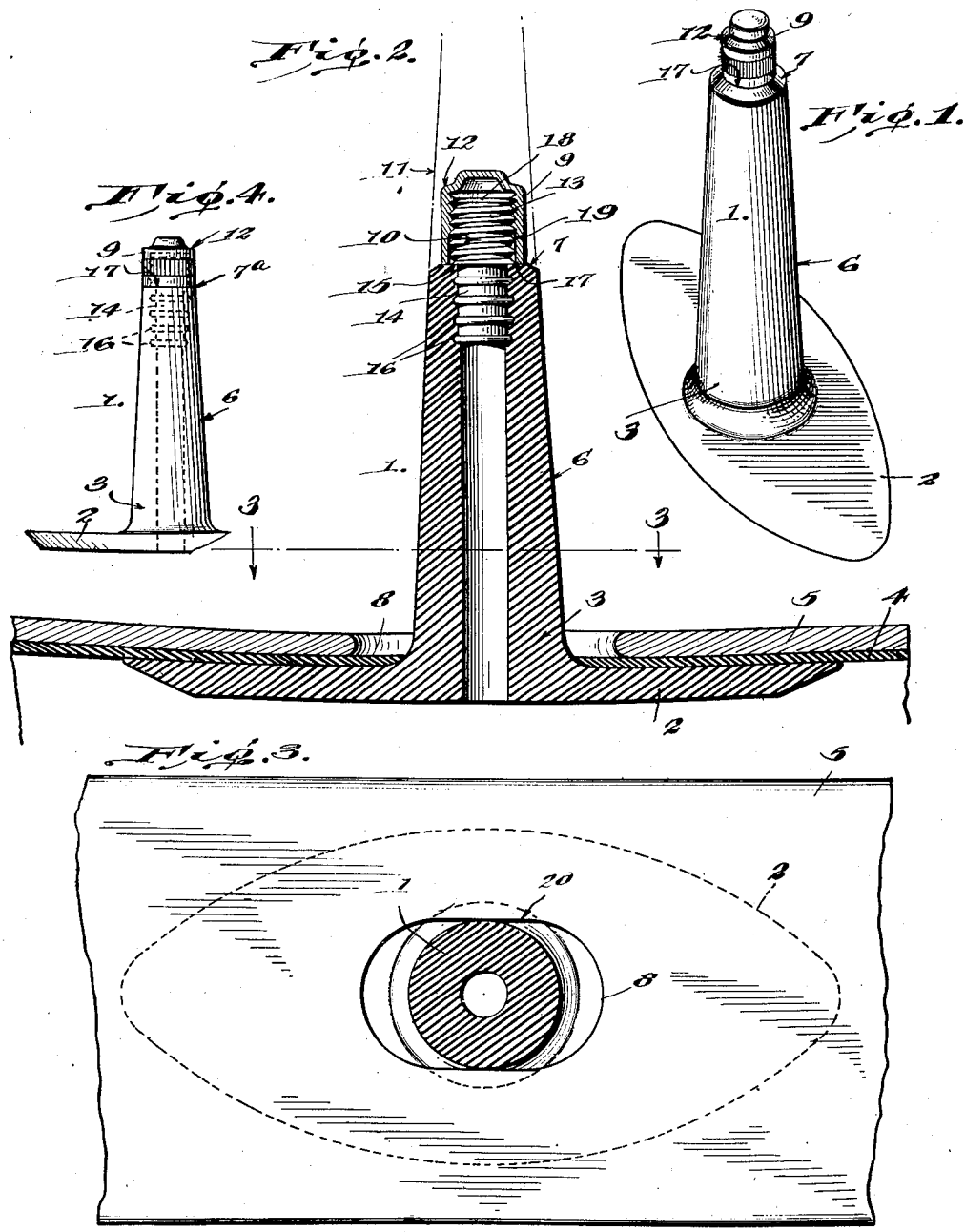
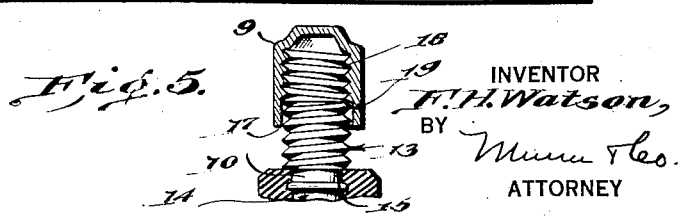
WITNESSES
INVENTOR
F. H. Watson,
BY
ATTORNEY Oct. 22, 1935. F. H. WATSON 2,018,584
VALVE STEM
Filed March 29, 1932   2 Sheets-Sheet 2
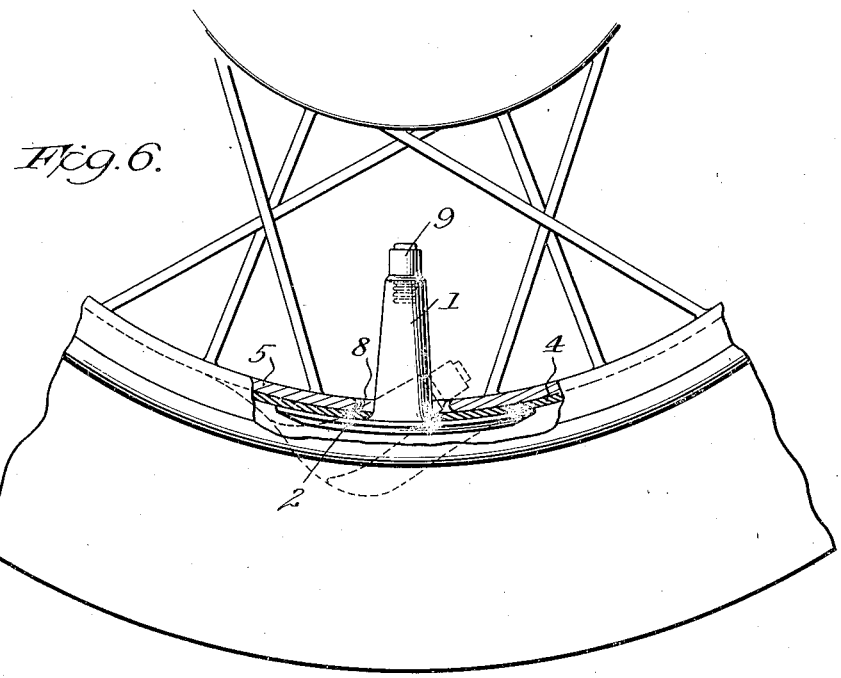
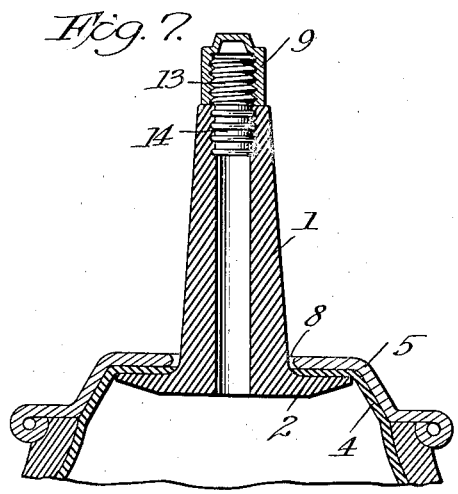
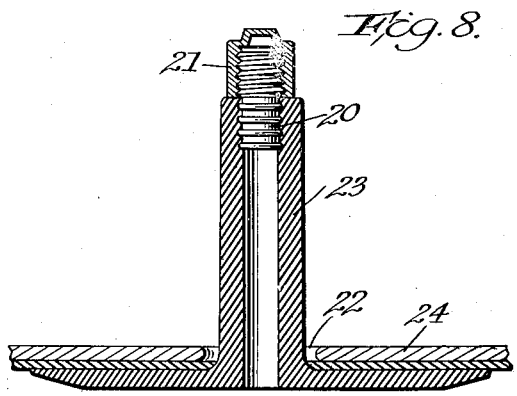
Inventor
F. H. Watson

Patented Oct. 22, 1935

2,018,584

UNITED STATES PATENT OFFICE 2,018,584

VALVE STEM

Frank Hilliard Watson, Jonesboro, Ark.

Application March 29, 1932, Serial No. 601,893

5 Claims. (Cl. 152—12)

The present invention relates to improvements in pneumatic tires and particularly to such tires in combination with a rim, the object being to provide a stem of simple construction and so related to a rim hole provided therefor as to be capable of readily pulling through the latter upon deflation of the tire in use. The invention constitutes improvements in the construction shown in my prior United States Patent No. 1,804,294, granted May 5, 1931, and is a continuation-in-part of my United States application Serial No. 532,358, filed April 23, 1931.

In order that the stem may readily pull through the rim hole without damage to the tire, a number of characteristics are essential. According to the invention, the stem is composed of flexible, yieldable material such as rubber, a rubber compound, or similar material. In order that the stem may be free flexing, substantially from base to tip, the metal valve casing which is provided in its tip must be of relatively little length so as not to rigidify the stem throughout any considerable longitudinal extent. The exterior surface of the stem is smooth and uninterrupted from base to tip, and the metal valve cap has a diameter at most no greater than the diameter of the adjacent stem portion. While the stem is preferably tapered from base to tip, it may, if desired, be cylindrical. In any event, its cross section is preferably substantially circular.

In order that the stem may be readily pulled through the rim aperture upon accidental deflation of the tire, a certain relation should exist between the overall length of the metal insert and cap and the circumferential length of the rim aperture. While preferably the circumferential length of the rim aperture is greater than the overall length of the insert and cap, the overall length of the insert and cap should not in any event be substantially greater than the circumferential length of the rim hole.

In present day construction, the mounting rim for the tire is ordinarily a wheel felly of relatively thin metal. This being the case, with the size of the rim aperture properly related to the length of the metal parts, the stem can be pulled through the aperture at a substantial angle to its normal radial position without any abrupt flexing and consequent clinging in the aperture. Where a felly proper is present in addition to the mounting rim, the felly is circumferentially flared at the rim hole so as to avoid sharp flexure of the stem which would otherwise occur upon pulling the base of the stem in the circumferential direction of the wheel.

A principal object of the invention, then, is to so form and construct a stem and so relate it to a rim aperture as to render it readily movable out of the latter under the circumstances above mentioned.

Another object of the invention is to provide a wheel of the drop-center type having a rim opening for use in connection with the valve stem, this opening may take various forms, as, for example, oval, elliptical, oblong, or other shape, and of such area as to facilitate the slipping out of the valve stem without jamming.

A further obejct of the invention, and one already touched upon in the earlier statement above, is to integrally attach the core container to the free end of the valve stem by vulcanization and without any exterior clamping means to interrupt the surface continuity of the stem, thereby to positively insure against the leakage of air along the joint between the valve stem and the core container, and, as stated, what is of very considerable importance, leave the exterior surface of the stem-member smooth from base to tip and uninterrupted by any external clamps or fastening means.

A further object of the invention is to provide a valve stem and sealing cap connection which will materially assist in the attainment of the main object aimed at, namely, the quick and ready release, without danger of jamming, of the valve stem from the rim-aperture, and this is accomplished, as will be hereinafter pointed out in detail, by providing a connection between the cap and the valve part to which it is secured of such character that the cap, whether completely unscrewed or partially unscrewed, cannot interfere with the ready passing of the valve stem through the rim aperture.

Other objects and advantages will appear in the following specification, reference being had to the accompanying drawings in which:

Figure 1 is a perspective view of the improved valve stem and its flap,

Figure 2 is a longitudinal section of a portion of a wheel felly and pneumatic inner tube, illustrating both the internal structure of the improved stem and its relationship to the foregoing parts.

Figure 3 is a cross section taken on the line 3—3 of Figure 2, particularly showing the opening, here shown as an elongated opening in the wheel felly, Figure 4 is a side elevation of a modification of the valve stem.

Figure 5 is a partial sectional and elevational view illustrating the total disconnection of one set of threads from the other upon a partial separation of the cap from the core container.

Figure 6 is an elevational view illustrating in full lines the normal position of the valve stem in use, and in dotted lines showing the stem as pulling through the rim aperture.

Figure 7 is a transverse section through the rim and stem, while

Figure 8 is a longitudinal section of a portion of a wheel felly or rim and a stem of somewhat modified form.

The valve stem generally denoted 1 has an attached flap 2 at its base 3, which flap is manufactured or otherwise permanently connected on the inside of a pneumatic inner tube 4. Only a fragment of the felly 5 of a wheel is shown in the drawings, this being thought sufficient to illustrate the relationship of the valve stem 1.

It is in the valve stem 1 that the major improvement resides. The sides 6 of this stem are on a continuous, uninterrupted taper from the base 3 to the top 7 at the free extremity of the valve stem, which top 7 is either on a slight bevel as in Figure 1 or straight across as at 7ᵃ in Figure 4. The slight bevel 7 has the advantage of eliminating a slight amount of rubber, and is a contribution toward the continuously diminishing size of the valve stem which is so desirable in producing the tapering contour herein assayed. The bevel 7 has the additional advantage of providing a relief place below the customary air chuck when applied. The tapering contour and the smooth uninterrupted and uniformly surfaced and yielding exterior of the stem, free from extraneous fastenings, clamps, or parts of metal or other material dissimilar to that of the stem is regarded as of utmost importance because by means of such make-up the valve stem is enabled to escape from the opening 8 in the felly 5 upon deflation of the inner tube 4 and this without any possibility of damage to the stem, its associated valve parts, or the inner tube.

In considering this phase of the invention it must be borne in mind that ordinarily in the known types of pneumatic tire equipment use is made of a rigid metallic stem which is secured both to the inner tube and the felly of the wheel by appropriate clamp nuts. In the event of deflation of the inner tube an immediate motion of the casing relatively to the tube is set up, tending to drag the tube around and thus tearing and mutilating the inner tube because of its fixture to the felly of the wheel. This necessitates discarding the destroyed inner tube and replacing it at the cost of a new one. In other constructions of the prior art, yieldable stems have been provided, but so combined with rigid valve parts as to result in a stem rigid throughout the major portion of its length, which rigid valve parts, even in the absence of the objectionable clamps or other extraneous fastening means referred to, would, because of their length and the absence of external smoothness and particularly of longitudinal taper, jam in the rim aperture and result in stem or tire injury. By making the valve stem 1 so that it can slip through the felly, and especially of rubber or other flexible, vulcanizable material and of tapering shape and without external clamping means, the valve stem is enabled to bend and easily conform to the stresses put upon it, or to entirely slip through the opening 8 and, collapsing to conform to and lie snug between the tube and casing, follow the tube and casing around the wheel so that no damage is sustained by the valve stem or the inner tube 4, and this advantageous result will be accomplished even if, with the tube deflated, there is drag or relative circumferential movement between the casing and the tube.

These results are directly augmented by the particular type of cap 9 used in conjunction with the core container 10, which core container is to be regarded as a check valve, although actually the elements of the check valve are situated inside of the chamber 10. The cap 9 is usually cylindrical and is so regarded herein. The largest diameter of the cap is either smaller or at the most equal to the top 7, 7ᵃ (Figs. 2 and 4) of the stem member. In the instance of Figure 2 there is a direct step off from the size of the free end of the stem 1 to the size of the cap 9. In Figure 4 the cap 9 is a practical continuation of the smallest diameter of the stem 1. In other words, there is a successive diminution in diameters which maintains the prevailing tapering shape of the valve stem 1. In the instance of Figure 2 it will be noticed that the extension or continuation 11 of the tapering sides 6 falls well outside of the top rim 12 of the cap. This means that all of the cap 9 is embraced by the stem 1, every point of the cap 9 lying within the extension 11 of the tapering walls 6. In Figure 4 this is not true, but the protrusion of the top rim 12 beyond the continuation of the tapering sides of the stem will in no way interfere with slipping through the opening 8.

The advantage of this circumstance is that in the event of a slipping through of the valve stem 1 following a tire deflation, the cap 9 will not offer any obstruction whatsoever. There is absolutely no outstanding portion of the cap that will hang on an edge of the opening 8 and so circumvent the easy slipping through of the valve stem already initiated by the tapering sides 6.

The core container 10 is made in two main diameters, that of the threaded projecting portion 13 being greater than that of the embedded shank portion 14. The difference in sizes produces a shoulder 15 surmounting the shank portion and this shoulder is intended to rest on the top 7, thus limiting the insertion of the core container 10. With the core container made in standard sizes with the shouldered construction shown and described, there will, of course, be absolute uniformity of the assembly of the container and the valve stem. The outer surface of the part 14 is interrupted in any desired way so as to afford a better anchorage between the part 14 and the substance of the valve stem 1, the interruptions shown comprising a plurality of annular beads 16.

In addition to producing a shoulder at 15 the reduced part has the added advantage of maintaining a given thickness in the adjacent wall of the valve stem 1. The meaning of this is readily understood. If the part 14 were materially larger than the bore of the stem-member 6, it would be necessary to provide a preformed socket at the top of the stem-member to receive it, and there would be a corresponding diminution in the thickness of the surrounding wall of the valve stem 1, and a reduction in the strength by that much.

But by reducing the part 14 there results not only the shoulder 15 but also an instrumentality for maintaining a desired thickness of the surrounding stem wall, which in its practical effect results in such strength at this particular point that nothing but a forcible tearing through of the valve stem will ever produce a separation.

This is so because the part 14 is vulcanized in place. It will be understood that vulcanization is actually accomplished in incorporating the part 14 (Fig. 2) in the valve stem 1. The metallic part is not merely molded in the rubber stem, but in the process of manufacture a load of approximately 150 tons is imposed on the rubber while in the mold, thereby unifying the metallic part 14 and the rubber by a combination of both heat and pressure which constitutes vulcanization. This results not only in a complete tying together of the metal part and the stem without the use of any extraneous devices, such as clamps, but also provides a union which will absolutely prevent air leakage between the stem and the part 14. The metallic part 14 and the end of the valve stem 1 become integral. There is no possibility of an air leakage at this point. This method of securing the metallic parts by vulcanization in the bore of the stem-member has very distinct advantages, particularly in the present development, where a metal valve part of relatively short length is mounted in the bore of the stem, for as stated, a permanent airtight joint is provided; the necessity of any outside clamps which would interrupt the exterior surface of the stem cause objectionable compression of the rubber wall is avoided. Furthermore, it is not necessary to reinforce with fabric the rubber of which the stem is formed, for the reason that since there is no diminution in thickness or compression of the rubber about the core container or metal valve parts, no creeping of the rubber under clamping pressure occurs. In other words, since the metal valve part is held in the stem solely by bore engagement. vulcanization of the parts provides a very efficient tying together of the parts and one which eliminates cost of production, and. from a practical standpoint, is a very marked improvement.

Another advantage in making the part 14 of reduced size is to clear the way, so to speak, for the free rim 17 of the cap. the unthreaded interior wall of which has a guiding fit over the threads on the part 13. If the part 14 were the same in size as the threaded end 13 the former would offer an obstruction to the rim 17. As it is the rim 17 is capable of and intended to be forcibly engaged with the top 7 and even buried thereinto so as to make a hermetical seal. The rim 17 being outwardly spaced from the shank portion of the insert, direct cleaving action between the shank portion and the surrounding rubber body is avoided, the material between the rim and the shank portion being pressed toward the latter.

This provision becomes possible by making the internal length of the cap greater than the threaded end 13 so that there will be an appreciable distance between the top of the end 13 and the internal shoulder inside of the cap 9. While it is possible to extend the threads 18 from the rim 17 of the cap to the internal shoulder, it is preferred to stop the threads above the rim 17 so as to leave a smooth and unthreaded bore 19 which will enable the easy disconnection of the cap 9 from the core container in the event of the unthreading of the cap.

It is conceivable that a cap threaded full length of its bore may become partly unscrewed from the threaded end 13 of the core container so that the projection from the top of the valve stem will be considerably longer than it ought to be. A cap thus partially unscrewed can offer a serious obstruction to the escape of the valve stem through the opening 8. In fact it can hang crosswise and cause a snapping off of the core container.

This contingency is avoided by confining the threaded area 18 (Fig. 5) to the inner end of the bore of the cap 9 leaving the portion 19 smooth. Under the circumstances named before, the total unscrewing of the cap 9 as in Figure 5 would equal the partial unscrewing of the cap cited in the illustration, but instead of hanging in the opening 8 and offering an obstruction to the escape of the valve stem 1, the cap 9 would readily come off. The relatively short threaded area 18 interiorly of the cap 9, while of sufficient length to give proper engagement of the cap and nipple, is of such length that the cap will be completely disengaged from the nipple or valve part before it is extended to a position which would tend to jam it in the rim hole or stem opening, thus preventing the difficulty which would arise if the cap threads were of sufficient length to remain in threaded engagement with the nipple or valve part after the cap had been partially unscrewed and the overall length of the valve and cap unduly extended.

There is another outstanding advantage in the partially threaded cap 9 in addition to the foregoing advantage of ready disconnection from the core container. The second advantage is quickness in applying and screwing the cap 9 home. When the cap 9 is emplaced approximately as shown in Figure 5 it is already about one-half in its final position. The smooth bore 19 facilitates "finding" the threads on the end 13, for, as pointed out, the unthreaded skirt of the cap fits snugly with a guiding fit the threaded part 13 and so brings the threads 18 of the cap to accurate position for engagement with the threaded part. It is only necessary to impart a few turns to the cap 9 when the latter will be found tightly engaging the top 7, 7a in its final sealing-off position.

Reference is made to Figure 2. By comparison of the length of the inserted part 14 with that of the valve stem 1 it will be noted that the inserted part 14 is of minor size. In other words, the inserted part 14 is of minor length in comparison with the length of the stem 1. That portion of the stem immediately embracing the inserted part 14 is stiff and unyielding, but the remainder of the stem approximately from the base 3 to the bottom of the part 14 is flexible. This flexibility enables any necessary bending over of the stem while slipping through the opening 8. In fact the stem may virtually be doubled upon itself without any injury whatsoever to its structure.

Reverting now to the opening 8 it is to be noted (Fig. 3) that, as here shown, and preferably, this is of an elongated shape. The elongation is in the circumferential direction of the felly 5. It makes little difference what the exact shape of the opening 8 is, but it should be elongated in the circular direction of the wheel.

The transverse dimension 20 (Fig. 3) of the opening 8, when of an elongate form, is approximately the same as the base 3 of the stem 1. This makes a snug fit between the base 3 and the opening 8 crosswise of the felly. But there is room in the opening 8 at each side of the base 3 in the circumferential direction of the felly, and this feature of clearance, which is desirable, no matter what the shape of the opening 8 may be, has the following advantage.

In the event of deflation of the inner tube 4 there will be a circumferential creeping of the inner tube relatively to the felly 5. The valve stem 1 will begin to bend when the front end of the opening 8 is reached. The tapering shape of the valve stem and its free flexibility, together with its smooth uninterrupted exterior throughout its entire length will enable the valve stem to slip through. This slipping through is materially facilitated by elongating the opening, or, if it be of other shape, providing sufficient area of opening to afford clearance for the pulling through of the stem, even though the metal valve part at the end of the stem be presented to the opening at an angle to the perpendicular, as is apt to be the case. The valve stem may fall or bend over at a very decided angle, yet it will not bind in the opening. However, with a valve stem having a smooth tapered stem exterior and the valve parts vulcanized in its upper end and so proportioned as to the length relative to the total stem length as to present a minor rigid section, the possibility of jamming in the rim aperture or the likelihood of injury to the tire or other parts when the stem is drawn in by shifting of tube and casing relative to the rim, is practically eliminated.

In Figure 6, I have shown the valve stem in dotted lines in a position which it is adapted to assume in being pulled through the rim aperture. As will be seen, the dotted line position of the stem is at a wide angle to its normal radial position so that even with the weight of the car on it, it would not be abruptly flexed and would pull on through without catching. As mentioned at the outset, if a felly were present in addition to the rim, it would be circumferentially cut away so as to permit the stem to approach the dotted line position of Figure 6.

The transverse section of the assembly in Figure 7 particularly shows the disposition of the flap 2 relative to the drop center rim, the flap being preferably laterally confined entirely to the well portion.

In Figures 1 to 7, the rim aperture has been shown as being of relatively greater circumferential extent as compared with the overall length of the metal parts. An extreme relation is shown in Figure 8 wherein the overall length of the insert or core 20 and cap 21 is slightly greater than the circumferential extent of the aperture 22 of rim 23. The relation is still such that the stem 23, here shown as being cylindrical, can be pulled through the aperture without abrupt flexure and without jamming of the metal parts. The stem 23 being cylindrical, is somewhat more flexible at its base than the tapered stem of Figures 1 to 7. On this account, however, it loses some of the strength inherent in the preferred tapered form of stem.

While the described construction and arrangement of the improved valve stems are those generally preferred, obviously modifications and changes may be made without departing from the spirit of the invention or the scope of the claims.

I claim:

1. The combination of a tire, a valve stem of yieldable material on said tire, a relatively rigid valve part in said stem, and a rim on which said tire is mounted, said rim having a hole through which said stem projects elongated in the circumferential direction of the rim to a length greater than the length of said rigid valve part to provide clearance for the withdrawal of the valve stem and valve part on deflation of the tire without jamming in the hole regardless of the angle to the perpendicular at which said valve part may be presented to the rim hole.

2. A valve stem for pneumatic tires comprising a tubular rubber body of generally tapered form the tip end of which is of smaller diameter than its base end and which is of such shape exteriorly as not to obstruct its withdrawal lengthwise through the aperture of a wheel rim while the latter is rotating, and a relatively rigid tubular valve-part-receiving insert in said body and having a portion at the tip end of the body adapted to be engaged by a closure, said insert being of such size and form and being so fitted and secured by bore engagement in the body as to preserve the external conformation of the body, said body having a continuous unconfined surface compressible throughout its length including the portion enclosing said insert.

3. A valve stem for pneumatic tires comprising a tubular rubber body of generally tapered form the tip end of which is of smaller diameter than its base end and which is of such shape exteriorly as not to obstruct its withdrawal lengthwise through the aperture of a wheel rim while the latter is rotating, and a relatively rigid tubular valve-part-receiving insert in said body and having a portion at the tip end of the body adapted to be engaged by a closure, said insert being of such size and form and being so fitted and secured by vulcanized bore engagement in the body as to preserve the external conformation of the body, said body having a continuous unconfined surface compressible throughout its length including the portion enclosing said insert.

4. A valve stem for pneumatic tires comprising a tubular rubber body of generally tapered form the tip end of which is of smaller diameter than its base end and which is of such shape exteriorly as not to obstruct its withdrawal lengthwise through the aperture of a wheel rim while the latter is rotating, a relatively rigid tubular valve-part-receiving insert having a shank portion in said body and having a projecting portion at the tip end of the body adapted to be engaged by a closure, said shank portion being of such size and form and being so fitted and secured by bore engagement in the body as to preserve the external conformation of the body, said body having a continuous unconfined surface compressible throughout its length including the portion enclosing said shank portion, said shank portion being of smaller size than the immediately surmounting portion of the insert so that the tip end of said body extends under said immediately surmounting portion, the tip end of the body also extending outwardly to provide an external circumferential shoulder at the base of said projecting portion, and a closure cap secured to said projecting portion and having an external skirt whose rim seats on said shoulder in substantial outwardly spaced relation to said shank portion to provide a seal, the spacing of said skirt edge from said shank portion avoiding direct cleaving action of the cap rim between said shank portion and the body tip, pressure of the cap rim on the body tip causing compression of the body material between said rim and said shank portion inwardly against the latter.

5. A valve stem for pneumatic tires comprising a tubular rubber body of generally tapered form the tip end of which is of smaller diameter than its base end and which is of such shape exteriorly as not to obstruct its withdrawal lengthwise through the aperture of a wheel rim while the latter is rotating, and a relatively rigid tubular valve-part-receiving insert in said body, said insert being of such size and form and being so fitted and secured by bore engagement in the body as to preserve the external conformation of the body, said body having a continuous unconfined surface compressible throughout its length including the portion enclosing said insert.

FRANK HILLIARD WATSON.